United States Patent [19]
Tricoles et al.

[11] 3,909,827
[45] Sept. 30, 1975

[54] METHOD OF AND SYSTEM FOR MICROWAVE INTERFEROMETRY

[75] Inventors: Gus P. Tricoles, San Diego; Eugene L. Rope, El Cajon, both of Calif.

[73] Assignee: General Dynamics Corporation, St. Louis, Mo.

[22] Filed: Aug. 30, 1974

[21] Appl. No.: 501,904

[52] U.S. Cl. .................................................. 343/17
[51] Int. Cl.² .......................................... G01S 7/04
[58] Field of Search ........................................ 343/17

[56] References Cited
UNITED STATES PATENTS
3,685,051  8/1972  Wells .................................. 343/17
3,852,745  12/1974  Lebail .................................. 343/17

*Primary Examiner*—T. H. Tubbesing
*Attorney, Agent, or Firm*—Martin LuKacher

[57] ABSTRACT

Images of objects are obtained by microwave signal radiators and receptors which are disposed in a two dimensional array with the receptors disposed orthogonally to the radiators. The output of the receptors for illumination provided separately from each of the radiators is compared with reference microwave signals coherent with the radiated signals but varied cyclically in amplitude and phase. The results of the comparison are a plurality of outputs, which may be in digital form and which correspond to minimums in the power level of the difference signals obtained by comparison of the received signals and phase and amplitude varying reference signals. These outputs provide a two-dimensional interference pattern which can be translated into a visual image of the object.

21 Claims, 6 Drawing Figures

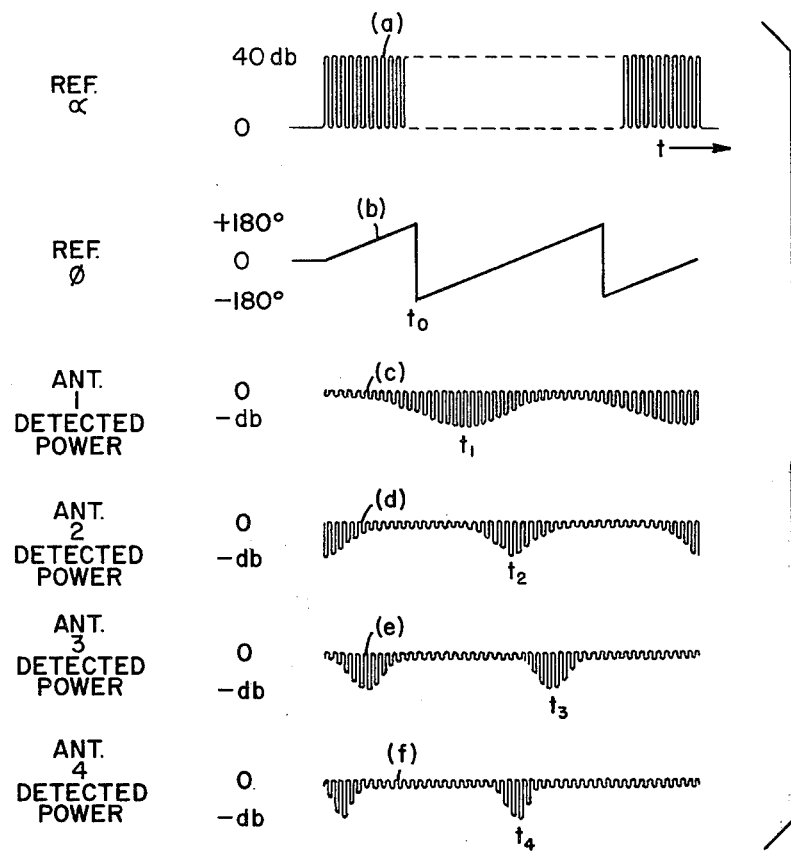
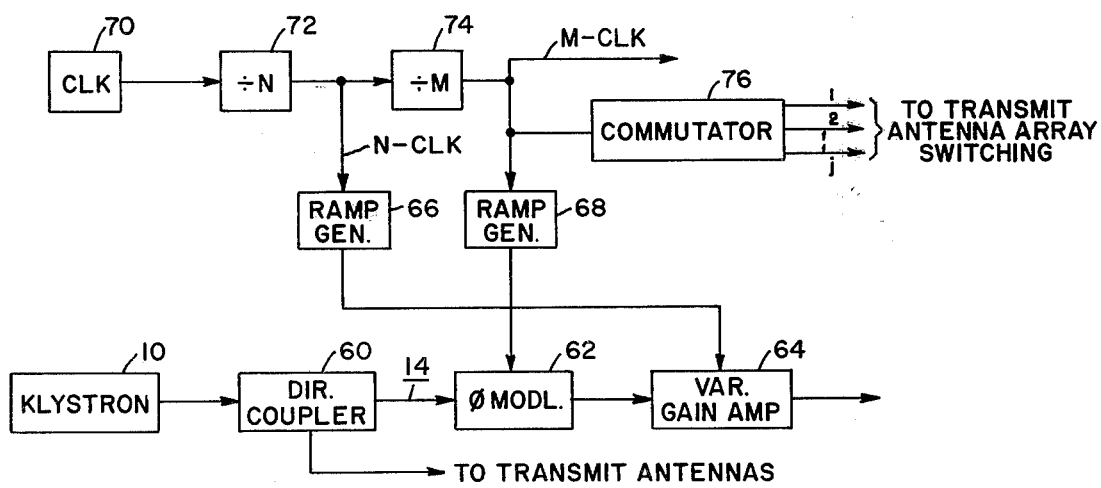
FIG. 4.

METHOD OF AND SYSTEM FOR MICROWAVE INTERFEROMETRY

The present invention relates to interferometry and particularly to methods of and systems for providing visual images of objects illuminated with microwave energy.

The invention is especially suitable for providing images of objects in a field of view, somewhat like a radar system. It is also applicable for detecting objects in optically opaque surroundings, as when buried underground or otherwise concealed from view. The system is also useful in diagnosing the propagation characteristics of microwave antennas and radomes as well as the propagation characteristics of microwave transmissive mediums.

In U.S. Pat. No. 3,388,396, issued to Gus. P. Tricoles and Eugene L. Rope, on June 11, 1968, there are described techniques for producing interference patterns from which microwave holograms are generated. These holograms may be used to provide visual images and are formed by microwave scatterers disposed at locations where interfering signal and reference beams of the microwave energy exist in a plane spaced from the object. It has been found in accordance with the present invention that data corresponding to such interference patterns from which visual images can be produced or even computed in real time can be obtained with the aid of a microwave antenna array, to the receiving antennas of which reference signals are applied that vary cyclically in amplitude and phase.

In one embodiment, the receptors are constituted by receiving antennas which are disposed at spaced locations along a path orthogonal to another path along which a plurality of transmitting antennas or a movable transmitting antenna may be located. For illumination of the field of view from each different location of the transmitting antennas or antenna, the received microwave energy from each of the receiving antennas is combined with a reference field which varies cyclically in amplitude and phase to produce interference. The amplitude and phases which result in minimum power levels in the intensity level of the interfering signals provide data as to the phase and amplitude of the received microwave field. This set of data provides an interference pattern that may be used to provide a hologram, as in the above-referenced patent. Preferably, however, the data corresponding to the amplitude and phase values are translated into an image by processing the data, as in accordance with the scalar Kirchoff diffraction formula for image formation by a lens. It is even possible to change the effective focal length of the lens in the course of the computation process and thus bring the image into focus.

Accordingly, the invention as its principal object, the provision of an improved method of and system for interferometry and especially for microwave interferometry.

It is another object of the invention to provide an improved microwave interferometric technique and arrangement which provides visible images of objects which are illuminated by microwave energy.

It is a further object of the invention to provide an improved microwave interferometry array together with a system and method for using the same for illuminating a field of view and producing visible images of objects in that field.

It is a still further object of the present invention to provide an improved method of and system for microwave interferometry in which reference signals are swept in amplitude and phase and applied to an antenna array so as to enable the use of a relatively uncomplicated antenna array to scan a wide field of view and to translate interference patterns resulting from objects illuminated with microwave energy in that field to be received and used for image formation purposes without the need for multiplexing the output of the antennas making up the array.

The foregoing and other objects and advantages of the present invention will become more apparent from a reading of the following description in connection with the accompanying drawings in which:

FIG. 3 is a series of waveforms of signals produced in the system shown in FIGS. 1 and 2;

FIG. 4 is a more detailed block diagram showing a portion of the system illustrated in FIG. 1;

Figure 1:
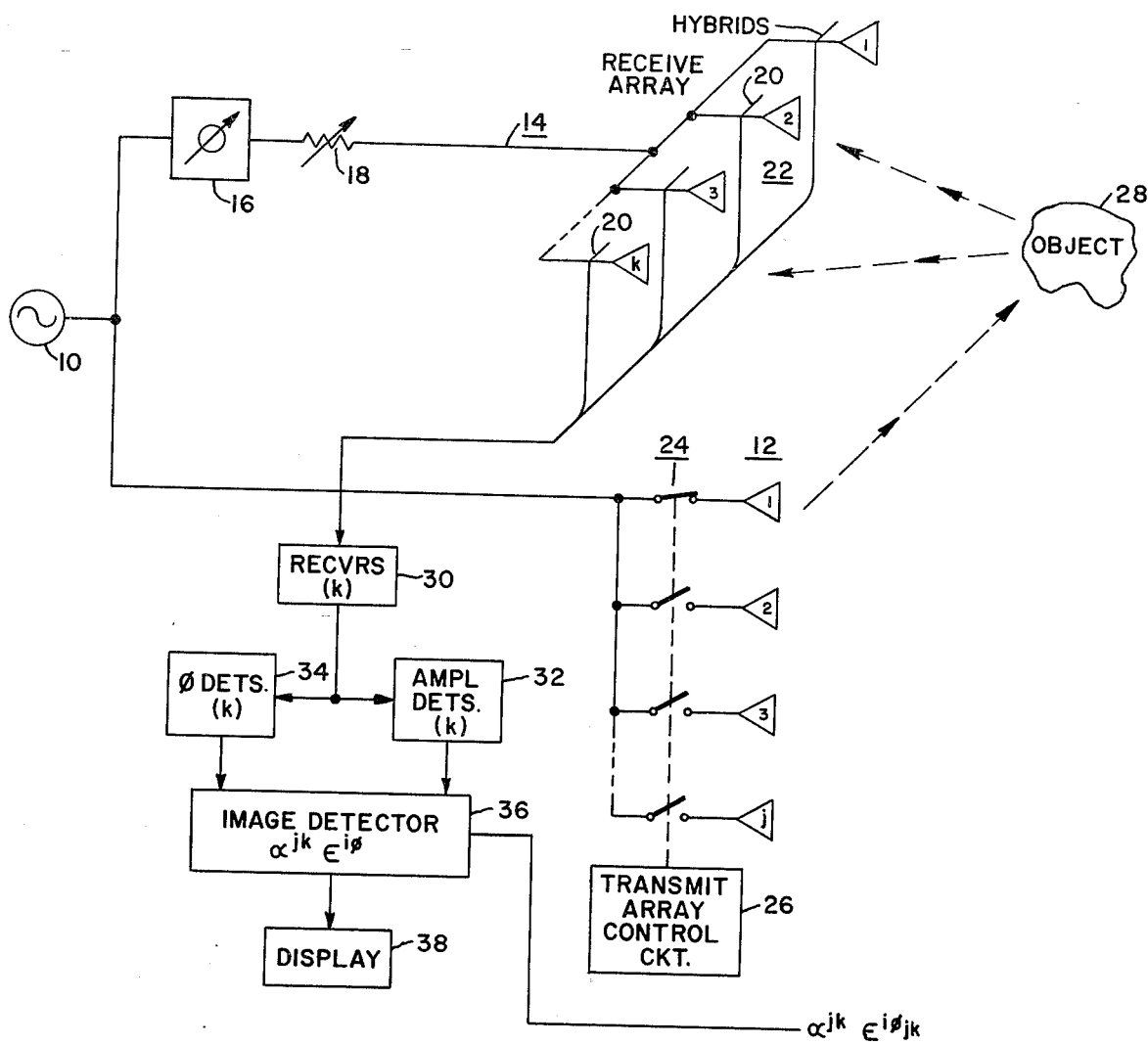
FIG. 1 is a simplified block diagram illustrating an embodiment of the invention.

Referring to FIG. 1, there is shown a source of microwave energy 10 which may be a klystron which may for example operate in the Ku band. The signals from this source 10 are applied to an array of transmitting antennas 12 and also along a channel 14 to a phase shifter 16 and a variable attenuator 18, which vary the amplitude and phase of the signals. The microwave signals are shifted cyclically in phase and in amplitude by the phase shifter 16 and attenuator 18 in the channel 14 and are applied as reference signals to one input port of a plurality of hybird or magic-T devices 20 of a receive antenna array 22. Since the microwave signals which are applied to the receive array 22 and to the transmit array 12 are from the same source 10, they are coherent with each other.

The antennas of the transmit array, which may be J in number, the first, second, third and jth of these transmit array antennas being shown to simplify the illustration, are disposed along a path which may be along a vertical line. The receive antennas which are $k$ in number are also disposed along a path which may be along a horizontal line. The first, second, third and kth antennas of the receive array are illustrated for the sake of simplicity. Suitably, there may be eight antennas in the receive array 22 and eight antennas in the transmit array (viz., both J and $k$ are equal to 8). In other words the receive and transmit antennas are disposed along the lines transverse, and more particularly as illustrated in this embodiment of the invention, orthogonal, to each other. Also it is preferable that the antennas of the transmit array 12 and the receive array 22 be in the same place.

The microwave signals are applied to the transmit antennas through a commutator arrangement 24 indicated as a separate switch associated with each antenna. These switches may be wave guide switches operated by a transmit array control circuit 26. The control circuit closes the switch associated with the first antenna first, the second antenna next, and so forth, so that microwave energy from different locations on the path along which the transmit antennas are disposed is directed to the field of view, successively, to illuminate an object 28 in that field. When the jth transmit antenna 12 has illuminated the field, a two-dimensional interference pattern will have been produced which is effectively in the plane of the receive array 22, as will be explained more fully hereinafter.

The antennas of the receive array are also spaced along the same path (viz. the horizontal line) and will simultaneously receive returns from the field of view (e.g. from the object 28 in that field). The received signals are then applied to an input port of the hybrids 20 such that difference signals corresponding to the difference between the received signals and the reference signals which are presented to the hybrids 20 by the channel 14 are produced at the outputs of the hybrids. Since the reference signals are varying in amplitude and phase, the difference signals at the hybrid outputs will correspond to the interference patterns produced by the object. In order to detect the interference pattern, receivers 30 are provided which are also $k$ in number, one for each of the receive antennas in the array 22. These receivers may be available microwave receiving units, preferably with a wide dynamic range, such as receivers used in sensitive radar sets. Each of the receivers has a power detector and provides outputs which vary in accordance with the power of the difference signals from the hybrids 20.

The amplitude and phase of the reference signals which produces a minimum power level is characteristic of the interference pattern. In order to measure and detect this amplitude and phase, amplitude and phase detectors 32 and 34, which are $k$ in number, are connected to the receiver outputs. The amplitude and phase is detected by measuring the intervals of time or portion of each "cycle" of amplitude and phase variations of the variation of the reference signal, preceding the occurrence of the detected power minima. Alternatively, amplitude and phase may be measured by manually adjusting the phase shifter 16 and the attenuator 18 until a power minimum is observed at the output of the receiver 30. The adjustment (viz. the amount of phase shift introduced by the phase shift 16 or the amount of attenuation introduced by the attenuator 18) is then the measure of the amplitude and phase corresponding to the interference pattern at a particular receive antenna.

The phase shifter 16, itself may be a ferrite phase shifter of the type incorporated in a wave guide which shifts the phase of the microwave signals 360° (viz. from −180° to +180°). The attenuator 18 may also be a microwave attenuator of the type which is commercially available and which can insert at least 40 dB of attenuation.

Inasmuch as a receiver 30 as well as an amplitude and phase detector 32 and 34 are associated with each of the antennas in the receive array 22, the amplitude and phase information from all the antennas is provided simultaneously and without the need for multiplexing. Each time a cyclical variation of amplitude or phase, whichever occurs at the lowest frequency, is completed, $k$ amplitude and phase outputs are transferred to an image detector 36 which may be implemented by a computer. Then the commutator switches 24 disconnect the preceding antenna and connect the succeeding antenna of the transmit array 12 to the source 10. In other words, after the amplitude and phase information produced when the first transmit antenna is connected to the source has been transmitted to the image detector, the second transmit antenna is connected to the source and the first antenna disconnected. Another group of $k$ phase and amplitude outputs is then transferred to the image detector 36. Finally, after the jth transmit antenna is connected to the source 10, the last group of amplitude and phase outputs is obtained and transferred to the image detector 36. Each amplitude and phase output may be considered to be of the form $$\alpha^{jk} \epsilon^i \phi jk$$

which is the classical optical amplitude equation where $\alpha$ represents the amplitude of the illumination at a point $jk$ in the image plane and $\epsilon^i \phi jk$ represents the phase of the signal at the point $jk$. The image detector 36 may utilize a storage device such as a film shown in the above referenced patent where there are $k$ columns of $j$ rows of indicia representing the interference pattern corresponding to the amplitude and phase for minimum received power at each such point. For example a so-called detour phase hologram may be constructed by multiplying, as in a modulator or other analog multiplier device, each of the amplitude and phase measurements and intensity modulating the Z input of an oscilloscope in accordance therewith as horizontal lines corresponding to each transmit antenna location are scanned. The display on the screen which has persistence is photographed to form the detour phase hologram on a transparency. The image may be reconstructed by illuminating the transparency to provide a display 38 showing the image, as on a screen. Preferably however, the image detector 36 includes a system for storing the amplitude and phase data in digital form and translating the stored information into digital information representing the image through the use of the scalar Kirchoff diffraction formula for image formation by a lens. This digital information may then be presented to a display, such as a plotter which will reproduce the image. Suitable digital data generating and handling apparatus for image detection and display purposes (viz. computer apparatus) will be discussed more fully hereinafter in connection with FIGS. 5 and 6.

Figure 2:
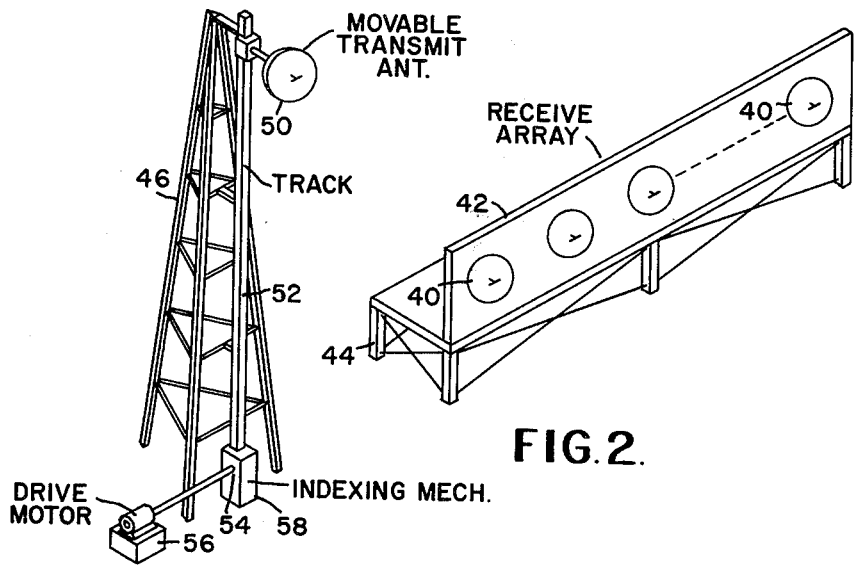
FIG. 2 is a perspective view illustrating an antenna array provided in accordance with another embodiment of the invention.

FIG. 2 illustrates the antenna array as being constituted of a series of antenna 40 mounted horizontally in side-by-side relationship on a beam 42. The beam is supported on a stand 44. Adjacent to the stand is a tower 46. On this tower there is another antenna 50. This antenna is mounted on a track and may be moved by a chain drive 54. The chain is driven by a drive motor 56 through an indexing mechanism 58 such that the antenna is moved vertically between successive positions along the track 52. The transmitting antenna 50 and the receive antennas 40 are also desirably in the same plane. The tower may be to the side of the receive array or immediately above it, as for example would be convenient, if the movable antenna was mounted on a mast of a ship. For each position along the vertical path of the transmit antenna, a set of amplitude and phase outputs is obtained, as by the hybrids, receivers and detectors 20, 30, 32 and 34 discussed in connection with FIG. 1. Accordingly, an interference pattern may be produced and images computed or otherwise obtained therefrom.

FIG. 3 illustrates in waveform (a) and (b) thereof the reference amplitude and phase variations as represented by the cyclical variations of the attenuator 18 and the phase shifter 16 respectively. Such variations may be obtained electromagnetically by connecting a drive motor to the phase shifter 16 and to the movable element of the attenuator 18.

In order to make most effective use of the dynamic range of the receiver 30, it is desirable that the amplitude variations be at a much higher rate than the phase variations; amplitude variations at a frequency four or more times greater that the frequency of the phase variations being suitable. The waveforms (a) and (b) in FIG. 3 illustrates that for 360° of phase variation, the amplitude of the reference signal as applied to the hybrid 20 will vary through about a 40 dB range about 30 times.

The signals detected by the receivers associated with each of the receive antennas, four of which are shown in waveforms (c) to (f) for purposes of illustration of the principles involved, will exhibit peaks and nulls which occur at different times. The times of occurrence of these nulls (the most negative of the signals shown in waveforms (c) to (f)) is detected in the amplitude and phase detectors 32 and used to determine the amplitude and phase shift of the reference signals corresponding thereto, as by measuring the elapsed time in each cycle of variation prior to the occurrence of a minimum power level. Thus, for example in waveform (c) the phase shift will be measured between the times $t_0$ and $t_1$; and for waveform (d) between the time $t_0$ and $t_2$ for the phase output from the second antenna. The amplitude output may be similarly determined. Ambiguities are eliminated by taking $t_0$ at any positive going crossover of the reference amplitude variations as shown in waveform (a).

The generation of the microwave energy which is swept cyclically in amplitude and phase for reference purposes may also be accomplished as shown in FIG. 4. A klystron source 10 applies the microwave signals to the channel 14. These signals first pass through a directional coupler 60 which extracts power for driving the transmit antennas.

The phase shifter may be a phase modulator 62 provided by a yittrium-garnet or yig filter which is a known device presenting different amounts of phase shift in accordance with the amplitude of a control voltage which is connected thereto. The output of the modulator then is applied to a variable gain amplifier 64 which may be a travelling wave tube amplifier, the gain of which is also controllable by a control voltage in accordance with conventional techniques.

These control voltages are obtained from ramp or sawtooth generators 66, 68. A source of repetitive or clock pulses 70 is divided by N and then by M as in counter type dividers 72 and 74. The ramp is terminated and restarted by pulses from the counter 72 and 74. The ramp produced by the generator 68 will, since it is triggered by the last counter 74, have a lower frequency than the ramp producing the control voltage for varying the amplitude of the signal which is obtained from the generator 66; the ratio of the frequencies of the phase control ramp to the amplitude control ramp being N/M. The output of the counter 74 is used to strobe a commutator which provides j separate outputs, a different one each time a pulse from the counter 74 is produced. These outputs control the switching 24 and the commutator 76 together with the switch operating devices (e.g. relays of microwave switches) constitutes the transmitter array control circuit 26 (FIG. 1). Accordingly, a successive transmit antenna is connected to the source 10 at the end of each phase shift sweep cycle.

Figure 5:
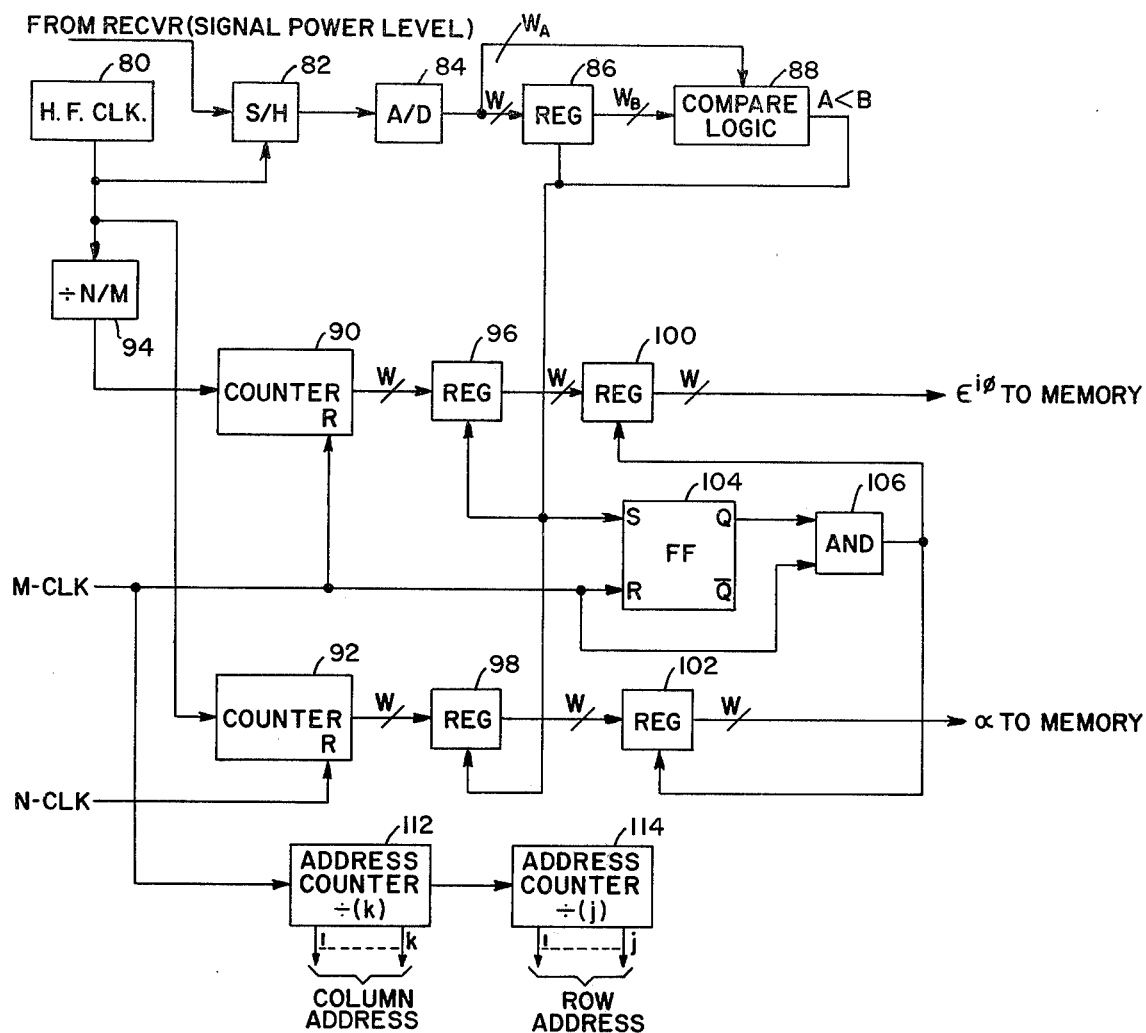
FIG. 5 is another block diagram illustrating a suitable system for detecting output corresponding to the amplitude and phase information of interference patterns which can be generated with the system shown in FIG. 1.

In order to provide digital signal outputs in the form of multi-bit digital words w corresponding to the amplitude and phase for minimum signal power during each sweep cycle, the digital system shown in FIG. 5 may be used. A high frequency clock 80 which produces pulses at a rate much faster than the rate of pulses from the counter 72 (FIG. 4) operates a sample and hold circuit 82 to which the received signals are applied. Each sample is converted by an analog to digital converter 84 into digital words having w bits, the number of bits depend upon the resolution of the image desired, 12 bits being suitable. The digital words from the converter 84 are applied to a register 86 and a compare logic circuit 88. This logic circuit may be one or more compare integrated circuit devices such as the type SN 7485 which is sold by the Texas Instrument Company of Dallas, Texas. The compare logic 88 produces an output when the succeeding word B is smaller than the preceding word A. This output applies a transfer pulse to the register 86, and thus outputs from the compare logic 88 will continue to be produced until the occurrence of the sample corresponding to the minimum signal power level.

In order to generate digital words corresponding to the amplitude and phase of the reference signals which produce this minimum power level, the high frequency clock is connected to strobe two counters 90 and 92. The pulses which strobe the counter 90 are first divided by a scaling factor N/M in a divider 94 which also may be a counter. The counter 90 is reset at the end of phase shift sweep by the M clock which is obtained from the output of the counter 74 (FIG. 4). The counter 92 is reset by the N clock obtained from the counter 72. Accordingly, the counters 90 and 92 can count numbers corresponding to the duration of each phase shift sweep and amplitude sweep cycle respectively. The multi-bit word which corresponds to the counts in the counter 90 is applied to the input of a register 96. The count in the counter 92 is applied as a digital word of w bits to a register 98. These registers 96 and 98 are enabled to receive for storage therein the counter output words only when the minimum power level condition is detected by the compare logic 88. The counter words corresponding to the time interval in each sweep cycle which occurs prior to the minimum power level is therefore stored in the counters 96 and 98. At the end of a sweep cycle, which occurs upon occurrence of the M clock, the words in the registers 96 and 98 are transferred to buffer storage registers 100 and 102. To this end a flip-flop 104 is set when a minimum power level signal is detected and enables an AND gate 106 which passes the M clock pulse as a transfer enable pulse to the registers 100 and 102. The digital word of the register 100 thus corresponds to the phase information $\epsilon^{i\phi}$. The word from the register 102 is a digital word corresponding to the amplitude or $\alpha$.

Figure 6:
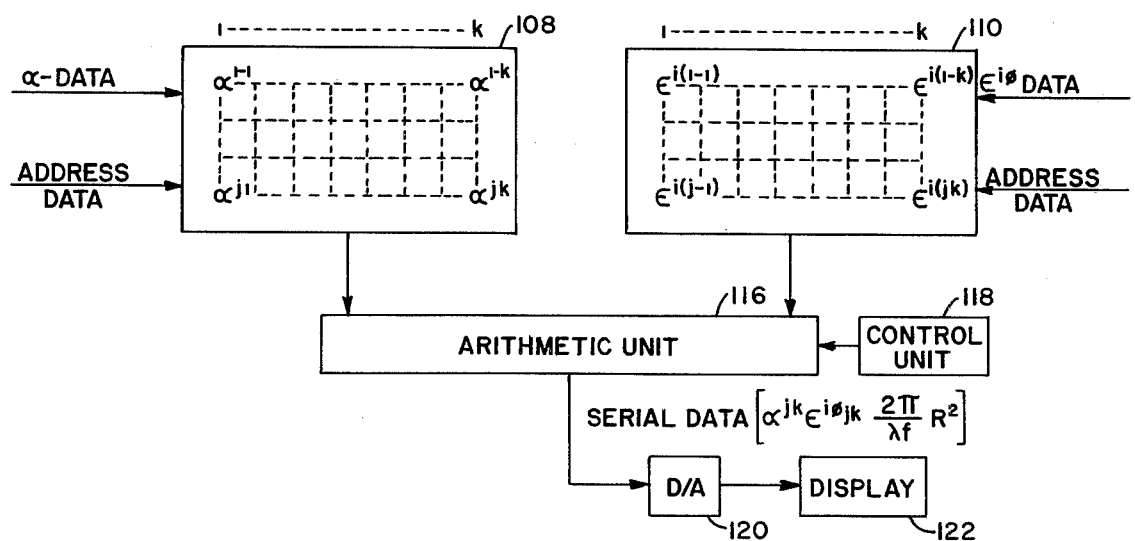
FIG. 6 is a block diagram which illustrates a suitable system for translating the interference pattern data into visual images by digital techniques.

These digital words are transferred to memories 108, 110 (FIG. 6) where they are stored in a matrix array. The address of each word for storage in the memories 108 and 110 are obtained from address counters 112 and 114 which divide by $k$ and $j$ respectively. Each M clock pulse is translated in the counter 112 into a different column address from column 1 to column $k$. For each $k$ column there is a different row address which is obtained by the divide by $j$ counter 114. As these addresses are successively applied to the memories 108 and 110, the amplitude and phase data words will be stored in the matrix arrangement as shown in FIG. 6.

The memories 108 and 110 may be contained in a general purpose digital computer such as the Control Data Corporation Model 6400. This computer also has an arithmetic unit 116 and a control or programming unit 118. This computer is programmed in accordance with the listing found in the Control Data Corporation Fortran Reference Manual, No. 60174900. Pages 3-1 to 3-10 and Appendix C1 to C4 to perform multiplication and exponential arithmetic operations and on Page 2-8 to perform matrix operation. This Manual may be obtained from the Control Data Corporation's Software Manufacturing and Distribution Division, 215 Moffett Park Drive, Sunnyvale, California, 94086.

The steps performed are to translate the interference pattern data as stored in the memories 108 and 110 into images through the use of the scalar Kirchoff diffraction formula for image formation by a lens. Pursuant to this formula, each amplitude word $\alpha$ is multiplied by each phase word $\epsilon^{i\phi} jk$ which is again multiplied by the lens function $2\pi/\lambda f\, R^2$ where R is the radius of the lens and $f$ is its focal length, $\lambda$ being the wavelength of the radiant energy used. R is equal to the square root of $j^2 + k^2$ (the Pythagorean theorum). The programming steps involved are to perform the multiplication square rooting and exponential operation in accordance with Fortran program listings obtained in the above referenced manual and then replace the products obtained for each of the operations back in memory in a matrix arrangement. In other words, the arithmetic operations are performed in the arithmetic unit under program control by the control unit 118 to provide, for each address location in the memories, the arithmetic operations for image formation (viz, a word corresponding to an $\alpha^{jk} \epsilon^{i\phi} jk\, 2\pi/\lambda f\, R^2$ is obtained) is performed and the result (i.e. the word) replaced in the matrix.

To complete the operations a fast Fourier transform is performed on the matrix of the product. The program for the fast Fourier transform may be the Tukey-Cooley method written at the Los Alamos Scientific Laboratories and distributed by VIM, Calalogue No. E2LASLC329A which is also obtainable from the Control Data Corporation, Software Manufacturing and Distribution Division, at the address given above. The data then stored in memory which may be read out through the arithmetic unit in serial fashion corresponds to the image of the object as formed by a lens of focal length $f$. In order to change the focal lenth and focus the image the operation discussed above may be repeated for different focal lengths. The serial data is outputted through the arithmetic unit 116 to a digital to analog converter 120 which provides its intensity information for a display 122 such as a cathode ray tube or a plotter. Accordingly, the image may be produced and plotted in real time.

From the foregoing description it will be apparent that there has been provided improves systems for and methods of interferometry capable of producing images of objects in a field of view. While the system has been described as using microwave radiant energy, other forms of radiant energy say millimeter waves or acoustic, especially supersonic waves may be employed. The system utilizes a reference field which is varied so as to provide interference pattern data or interference patterns themselves from either of which the images may be provided.

Variations and modifications of the hereindescribed systems and methods will undoubtedly suggest themselves to those skilled in the art. Accordingly, the foregoing description should be taken merely as illustrative and not in any limiting sense.

What is claimed is:

1. The method of microwave interferometry which comprises the steps of
   a. illuminating a field of view with microwave energy successively emanating from different ones of a first plurality of separate locations which are spaced along a first path,
   b. receiving said energy at different ones of a second plurality of spaced locations which are spaced along a second path transverse to said first path,
   c. combining said energy received at each of said second plurality of locations with microwave energy which is coherent with said illuminating energy and which varies cyclically in amplitude and phase to derive an interference pattern, and
   d. translating said pattern into an image of any objects in said field of view.

2. The invention as set forth in claim 1 wherein said first and second paths are orthogonal to each other.

3. The invention as set forth in claim 2 wherein said illuminating step is carried out by connecting different ones of a plurality of separate antennas successively to a source of said microwave energy.

4. The invention as set forth in claim 2 wherein said first path is horizontal and said second path is vertical, and said illuminating step is carried out by moving an antenna to which said energy is applied along said second path.

5. The invention as set forth in claim 4 wherein said moving step is carried out by indexing said antenna between successive positions along said path.

6. The invention as set forth in claim 1 including the step of generating said microwave energy from a common source for use in said illuminating and comparing steps.

7. The invention as set forth in claim 6 wherein said receiving step is carried out with the aid of an array of antennas spaced from each other along said first path, and including the steps of varying the phase of said energy from said source over 360° of phase shift during each cycle of phase variation, and varying the amplitude of said energy several times during each cycle of phase variation.

8. The invention as set forth in claim 7 wherein the steps of varying said phase and said amplitude is carried out such that the frequency of said amplitude variations is higher than the frequency of said phase variations.

9. The invention as set forth in claim 7 wherein said combining step includes the step of detecting for the illumination of said field from each of said first plurality of locations the amplitude and phase of said energy from said source which produces minimum power difference between the energy from said receiving antennas and the phase and amplitude of the energy from said source which is being varied in phase and amplitude.

10. The invention as set forth in claim 9 wherein said translating step includes the steps of storing the amplitude and phase for each of said power minimums, and processing the values of said stored amplitude and phase to simulate the image of the objects in said field which produces an interference pattern corresponding thereto.

11. A microwave interferometry system which comprises
   a. transmitting means for illuminating a region with microwave energy from a first plurality of locations spaced along a first path,
   b. means for receiving the energy returned from said region at different ones of a second plurality of locations spaced along a second path,
   c. means for combining the energy received by said receiving means for each of said first plurality of transmitting means locations at each of said second plurality of receiving means locations with microwave energy which is coherent with said illuminating energy and which varies cyclically in amplitude and phase to derive signals corresponding to an interference pattern, and
   d. means for translating said signals into an image of objects disposed in said region.

12. The invention as set forth in claim 11 wherein said first path and said second path are transverse to each other.

13. The invention as set forth in claim 12 wherein said transmitting and receiving means are provided by an array of antennas disposed in the same place.

14. The invention as set forth in claim 12 wherein said transmitting means includes at least one antenna and said receiving means includes a plurality of antennas each disposed at a different one of said second locations, and wherein said first and second paths are orthogonal to each other.

15. The invention as set forth in claim 14 wherein receiving antennas are disposed along a horizontal line and said transmitting antenna is movable disposed along a vertical line, and means for moving said transmitting antenna along said vertical line from one of said first locations to another successively.

16. The invention as set forth in claim 14 wherein said transmitting means includes a plurality of antennas each disposed at a different one of said first locations, and switching means associated with said transmitting means antennas for sequentially applying said microwave energy thereto.

17. The invention as set forth in claim 11 further comprising a microwave signal source providing means for applying signals from said source to both said transmitting and comparing means whereby said microwave energy for said comprising means and said illuminating energy are coherent with each other.

18. The invention as set forth in claim 17 including means connected to said source for shifting the phase of said microwave energy and for varying the amplitude of said microwave signals at first and second frequencies, respectively, said receiving means comprising a plurality of antennas each disposed at a different one of said second locations, and wherein said combining means includes a plurality of means responsive to said phase and amplitude varying microwave signals and each being coupled to a different one of said receiving antennas for detecting when the difference in power level between said varying signals and said received microwave energy is at a minimum level and providing outputs corresponding to the amplitude and phase of said varying microwave signals corresponding thereto.

19. The invention as set forth in claim 18 wherein said plurality of means which are included in said comparing means each includes a hybrid device having inputs connected to its respective receiving antenna and to said phase and amplitude shifting means and having an outlet for difference signals, a microwave signal receiver connected to said difference signal output for detecting the power level of said difference signal, means for detecthing when said different signal is of minimum power level, and means responsive to the occurrence of said minimum power level, for providing output signals corresponding to the amplitude and phase of said varying signals once during the cycle of variation of one of said phase and said amplitude, whichever is of lower frequency, when said minimum power level occurs.

20. The invention as set forth in claim 19 wherein said translating means includes means responsive to said amplitude and phase responsive output signals for providing a matrix pattern thereof, each row of which corresponds to the outputs from said receiving antenna when said transmitting means is in a different one of said first plurality of locations, and means responsive to said matrix for providing said image.

21. The invention as set forth in claim 20 wherein said output signals are digital signals, memory means for storing said digital signals in said matrix, and means for processing said digital signals in accordance with the scalar Kirchoff diffraction formula for image formation by a lens to provide said image.

* * * * *